United States Patent [19]

McMillan

[11] 4,219,300

[45] Aug. 26, 1980

[54] MATERIAL HANDLING APPARATUS

[76] Inventor: Joseph C. McMillan, Rte. 4, Box 511, Greensboro, N.C. 27406

[21] Appl. No.: 935,595

[22] Filed: Aug. 21, 1978

[51] Int. Cl.³ .............................................. B65G 65/23

[52] U.S. Cl. .................................... 414/420; 414/620; 414/622

[58] Field of Search ............... 414/420, 422, 607, 619, 414/620, 622, 408, 731, 732, 739

[56] References Cited

U.S. PATENT DOCUMENTS

| | | | |
|---|---|---|---|
| 2,647,650 | 8/1953 | Sherriff | 414/620 |
| 2,799,417 | 7/1957 | Morrell | 414/620 X |
| 3,206,052 | 9/1965 | Kennedy | 414/420 |
| 3,307,724 | 3/1967 | Miller | 414/607 X |
| 3,618,800 | 11/1971 | Collins | 414/420 |
| 3,739,929 | 6/1973 | McRobert | 414/420 |
| 3,797,684 | 3/1974 | Brandt | 414/607 X |
| 3,949,890 | 4/1976 | Keller | 414/620 X |
| 4,036,383 | 7/1977 | Allen | 414/420 |

*Primary Examiner*—Stephen G. Kunin
*Assistant Examiner*—Terrance L. Siemens

[57] ABSTRACT

A container haulage and dumping attachment for lift trucks includes a rotatable container gripping frame having a plurality of upper and lower tynes which are hydraulically activated to grip an open top container across the top and bottom thereof. The rotatable frame is pivotally mounted between the side walls of a lift frame, which in turn includes a rear wall by which the lift frame and rotatable frame are engaged and lifted by a lift truck. Upon lifting and movement to a dumping area the rotatable frame is activated to rotate forwardly about an axis parallel to the rear wall of the lift frame and transverse to the longitudinal direction of movement of the lift truck, whereby containers may be engaged across the top and bottom, lifted, moved, and tilted forwardly at least 90° to empty the contents from the containers.

6 Claims, 6 Drawing Figures

MATERIAL HANDLING APPARATUS

BACKGROUND OF THE INVENTION

In the harvesting of fruit and vegetables it is common practice to use relatively large containers throughout the fields or orchards which are filled by pickers or by automatic harvesting machines. The large containers are then moved to a central area where the fruit and vegetables therein are dumped into a washing, sorting, grading, or the like station. It is desirable for such containers to be as large as possible, to the extent of being capable of holding 5,000 lbs. or more of fruit or vegetables. Therefore, it can be seen that the dumping operation requires special equipment to handle such large size containers. While the instant invention is primarily directed to containers for fruits and vegetables, it is apparent that the ensuing description would be equally applicable to any other type of product or material which is loaded in an open top container, the container moved to a dumping station where it is dumped from the container and the container returned to the loading station.

Several problems arise because of the containers being used and the extreme weight involved. Care must be taken to adequately support the container as it is lifted and tilted in order to prevent rupture of the container sides or bottom during the dumping operation. For example, there are presently available lift trucks in which the tynes thereof will slip beneath a container and then rotate 90° or 180° about an axis parallel to the tynes to dump the contents of a container. However, when such rotation occurs, extreme pressure is brought to bear on the points of engagement of the types with the underside of the container. If the container is very heavy and if there is not sufficient reinforcing of the container at the areas of engagement, the container may fail or rupture with undesirable attendant results.

As far as the prior art is concerned one type of container dumping apparatus is illustrated in the Thompson et al U.S. Pat. No. 3,713,554. However, it can be easily seen that this is a specialized piece of equipment, that the device grips at points along the top edge of the container only, that the container itself must be very strong, especially at the upper edges thereof to withstand the forces exerted as the container is tipped, and that the maximum weight capacity of the apparatus is about 1,000 lbs. Further, the apparatus is not itself portable so that the containers have to be moved in from the fields, set down, then picked up by the apparatus disclosed.

Another patent exemplary of a material handling apparatus which is tilted to empty is disclosed in the Keneson et al. U.S. Pat. No. 3,656,643. This patent discloses a material handling box which is picked up between the horizontally spaced tynes of a lift truck and includes tyne or fork engaging members on the sides of the box. When all of the tyne engaging members (16,18,20) are engaged by the tynes the container is carried in an upright position. However, when the tynes are moved slightly rearwardly to clear the front members 16, the container will be caused to tilt to a dumping position. Obviously this type of apparatus is extremely limited in capacity because it must be narrower in width than the space between the tynes of the fork lift truck. Further, it is extremely important to note that the container can only be shifted on the tynes for tilting from a rest position. Therefore it could not be lifted and caused to tilt from an elevated position as would be necessary when lifting a container over the side of a wall or other impediment to dump the articles down on the other side.

SUMMARY OF THE PRESENT INVENTION

The present invention, however, is directed to a material handling apparatus which overcomes all of the above-mentioned problems and in this regard includes an apparatus which is adapted to be selectively attached to a conventional lift truck. The apparatus includes a container gripping or load engaging frame pivotally connected to a lifting frame so that the load engaging frame may be activated to rotate about an axis of rotation extending between the side walls of the lifting frame and transverse to the longitudinal axis of the lift truck. The load engaging frame includes a rear wall and a plurality of horizontally spaced lower tynes extending forwardly from the lower edge thereof, a plurality of horizontally spaced upper tynes extending forwardly in vertically spaced, parallel relation to the lower tynes, and a bracket means connecting the upper tynes to the rear wall for altering the vertical spacing between the upper tynes and the lower tynes for gripping the containers therebetween. The lifting frame includes a rear wall having forwardly extending side walls from the opposite ends thereof wherein the lateral space between the side walls is greater than the length of the load engaging frame.

Preferably the upper tynes are connected to the rear wall of the load engaging frame by means of a plurality of brackets which are hydraulically moved between an upper and lower position for varying the spacing between the upper tynes and lower tynes. Also, the pivotal connecting means includes a shaft extending between the ends of the load engaging frame and connecting the load engaging frame with the sides walls of the lifting frame, and a means for rotating said shaft to effect the rotational movement of the lifting frame. Alternatively the load engaging frame may be rotated around the connecting shaft for the same purpose.

It is therefore an object of the present invention to provide a material handling apparatus which is capable of transporting and dumping material from larger top containers than presently known without damage to the container.

It is another object of the present invention to provide a material handling apparatus of the type described in which the container is pivoted about an axis perpendicular to the direction of movement of the lift truck.

It is yet another object of the present invention to provide a material handling apparatus of the type described in which the upper and lower portions of the cargo container are engaged and supported and the container is pivoted about the center of gravity thereof as much as possible to prevent damage to the container.

Other objects and a fuller understanding of the invention will become apparent from reading the following detailed description of a preferred embodiment along with the accompanying drawings in which.

DETAILED DESCRIPTION OF PREFERRED EMBODIMENT

Figure 1:
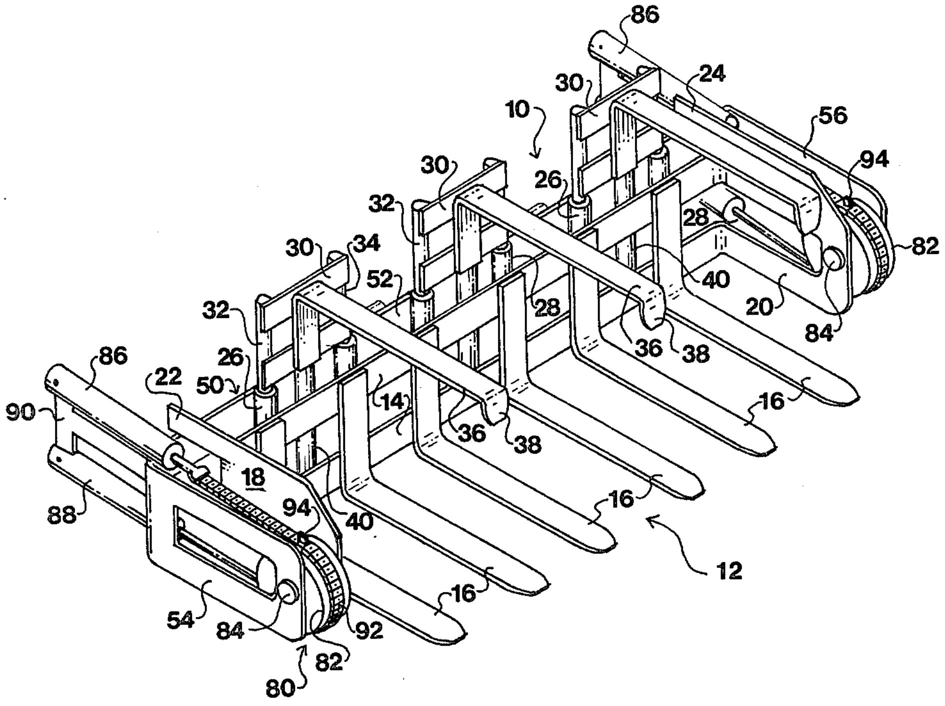
FIG. 1 is a perspective view illustrating the material handling apparatus in the process of being lifted and transported by a lift truck.

Turning now to the drawings, there is illustrated a material handling apparatus 10 of the type described which includes basically three components: a container gripping or load engaging frame 12, a support or lift frame 50, and a pivotal connecting means 80.

The container gripping frame means 12 includes a rear wall 14 and a plurality of horizontally spaced, lower tyne members 16 extending forwardly from the lower edge 15 thereof. The tynes 16 are arranged in pairs so that each pair cooperates with an upper tyne (to be later described) to form a gripping sub-assembly capable of holding a smaller container, or of cooperating with the other gripping sub-assemblies to help hold a container which is the length of the entire container gripping frame 12. A pair of side or end walls 18,20 extend forwardly in parallel relation to the tynes 16 from the side extremities of the rear wall 14. Portions 22,24 of end walls 18,20 respectively extend rearwardly to a point overlying the corresponding rear wall 52 of the support frame for reasons to be hereinafter described. At spaced positions across rear wall 14, there are secured a plurality of spaced pairs of upstanding cylindrical guides 26,28.

A sliding support bracket 30 includes a pair of depending rods 32,34 which slidably support the bracket 30 within guides 26,28 for vertical reciprocal movement as will be described hereinafter. Each bracket 30 includes an upper tyne 36 extending forwardly therefrom in vertically spaced, parallel relation to said lower tynes 16 and intermediate the corresponding pair thereof. The outer or free end of tyne 36 includes a depending lip 38 which serves to grip the upper edge of the container held therein and hold it as the container is being tilted to the dumping position. An elevating means for activating bracket 30 up and down is provided in the form of a hydraulic cylinder 40 attached to rear wall 14 with the piston thereof secured to the bracket 30 so that as the cylinder is activated and deactivated, bracket 30 is caused to raise and lower thereby gripping and releasing the containers by altering the vertical spacing between upper tyne 36 and its corresponding pair of lower tynes 16. The aforementioned sub-assemblies are therefore formed of a pair of lower tynes 16, an upper tyne 36, and the corresponding bracket 30 with its hydraulic cylinder 40.

It should be noted before completing discussion of the container gripping frame means 12 that in the embodiment shown there are a plurality of brackets 30, each having a forwardly extending tyne 36 which extends out over a pair of corresponding tynes 16, there being two lower tynes 16 for each upper tyne 36. As the bracket 30 is activated and deactivated then, all of the upper tynes 36 and lower tynes may be used to grip a single long container, or each bracket 30 and its corresponding pair of lower tynes 16 may be utilized to grip merely a small container, or there may be a plurality of smaller containers gripped corresponding in number to the number of brackets 30 or sub-assemblies spaced along the rear wall 14.

Turning now to a description of the support or lift frame 50, again there is provided a rear wall 52 (generally parallel to rear wall 14 of the gripping frame 12) with a pair of forwardly protruding end walls 54,56. A pair of rearwardly extending brackets or hooks 58 (or other conventional devices) are provided at spaced points along the rear wall 52 forming a pickup means by which the support or lift frame 50 may be engaged and lifted by a lift truck. The side walls 54, 56 are spaced apart a distance substantially greater than the distance between the end walls 18,20 of the load engaging frame, thereby providing clearance for the pivotal connecting means 80 to be described hereafter.

The pivotal connecting means 80 includes a drum 82 approximately twelve inches in diameter and three inches in thickness which is secured to the outer surfaces of the free ends of side walls 18 and 20. The drum 82 is mounted on an axle or shaft 84 which extends through a cooperating opening or bearing in the adjacent surface of the end walls 54,56 of the lift frame 50. So arranged, when activated, the load engaging frame is rotated along with drum 82 relative to the lift frame 50. It is apparent that shaft 84 can either be fixed to the side walls 54,56 so that the drum 82 rotates therearound, or the shaft 84 may be fixed to the drum 82 and rotate within a bearing in side walls 54,56. Either way the result is the same.

Figure 4:
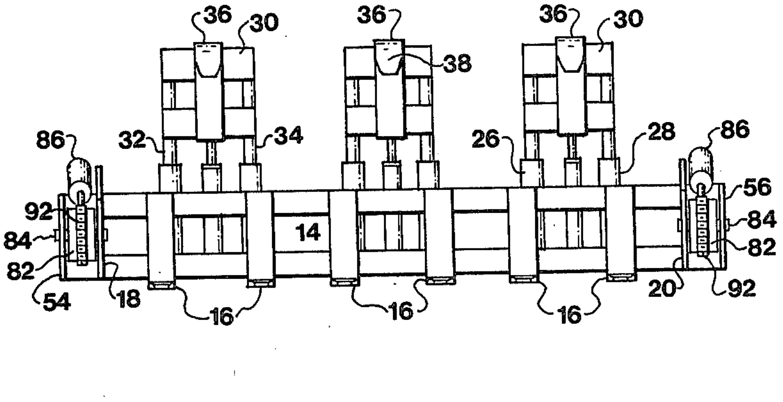
FIG. 4 is a front view of the apparatus according to the present invention.

In order to effect such rotation, each end of lift frame 50 has attached thereto a pair of linear actuators, preferably in the form of hydraulic cylinders 86,88 which are supported by a small connecting frame 90. Each of the cylinders 86,88 has the pistons thereof attached to opposite ends of a chain 92 which extends around drum 82. The chain 92 is attached at some point on the drum by a clamp 94, so that as the chain is moved longitudinally the drum is caused to rotate. Therefore, when one of the hydraulic cylinders 86,88 is activated so that the piston is extended, the other cylinder is oppositely activated so that its piston is withdrawn. The result will be a movement of the chain causing rotation of the drum and the load engaging frame 12 through an arc of at least 90°, and up to 180°. The aforementioned rearwardly extending protrusions 22,24 from side walls 18,20 of the load engaging frame provide a stop for the load engaging frame as it returns to its upright position. The protrusions 22,24 engage the upper edge of the rear wall 52 of the lift frame 50 so that rotation in a counterclockwise direction in FIG. 4 past the upright point cannot occur upon return of the load engaging frame to its normal lift and transport position.

Figure 2:
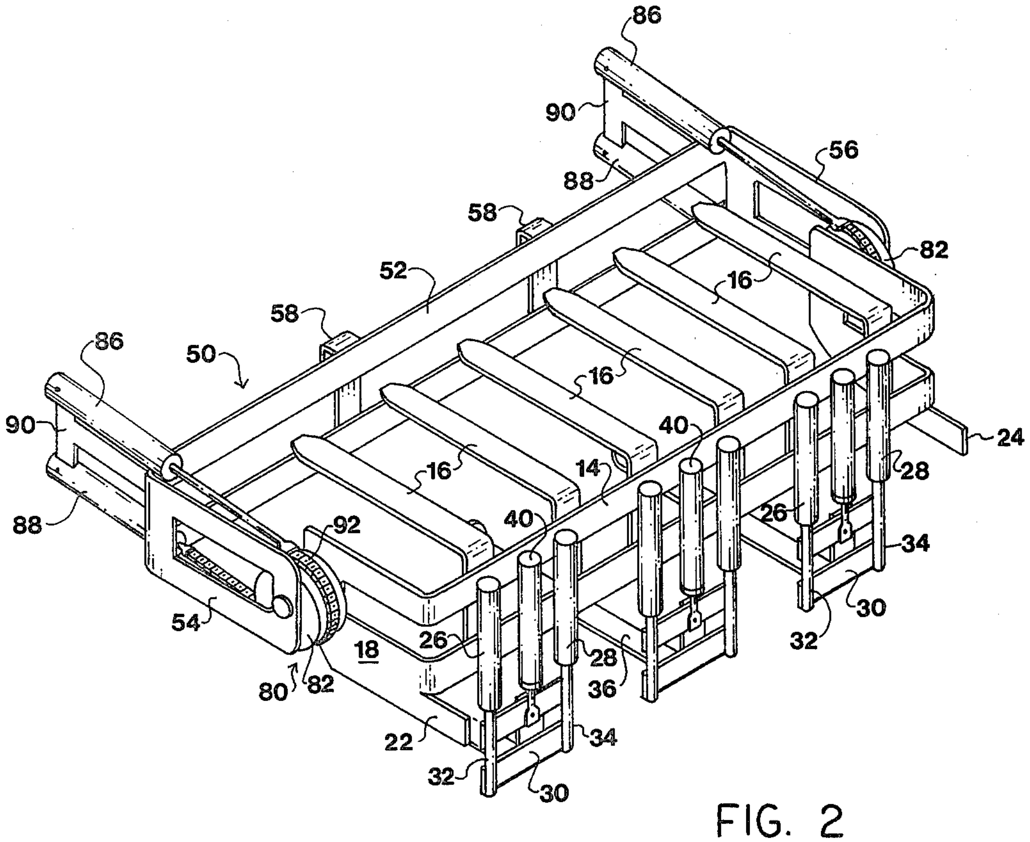
FIG. 2 is a perspective view similar to FIG. 1, except showing the container gripping frame rotated to the dump position.
Figure 5:
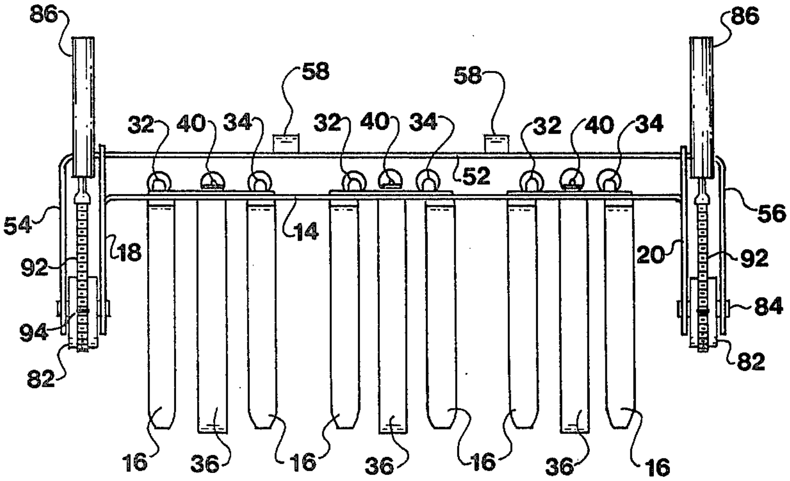
FIG. 5 is a top view of the apparatus according to the present invention.
Figure 3:
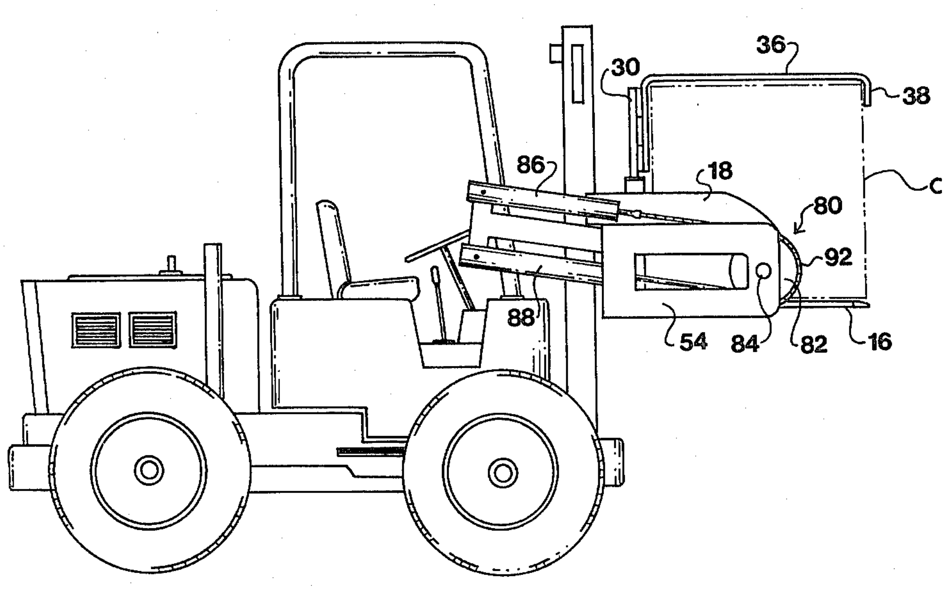
FIG. 3 is a side view of the apparatus according to the present invention.
Figure 6:
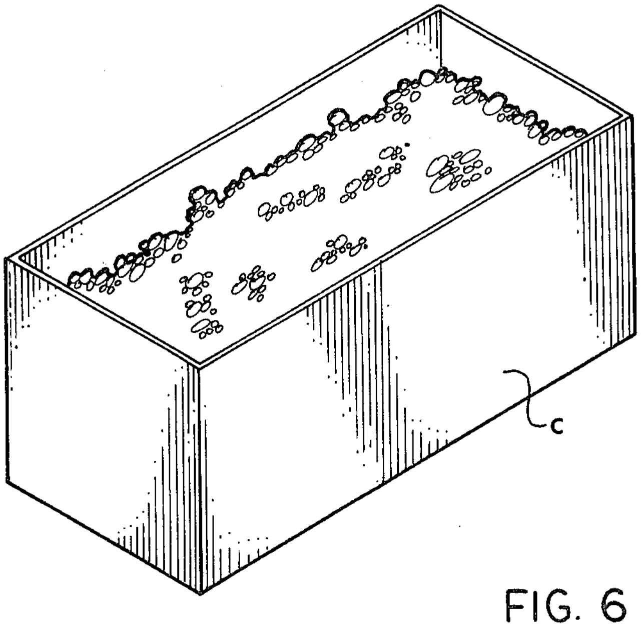
FIG. 6 is a perspective view of a container of the type for which the apparatus is designed.

In operation, the material handling apparatus performs in the following manner. During harvest time or other times when the apparatus 10 is desired to be used it is attached to a lift truck in such a manner that as the elevator of the lift truck is raised or lowered, the lift frame is caused to raise or lower with it. The truck is then moved into the field or other position which opened top containers C are being filled. The upper tynes 36 are then moved to their uppermost position by activating the hydraulic cylinders 40 associated therewith which lifts the brackets 30 and tynes 36. The lower tynes 16 are then moved in underneath the containers C as the lift truck lowers to its lowermost position. The hydraulic cylinders 40 are then returned to their retracted position and the tynes 36 grip down on the top of the containers with the lips 38 extending down across the opposite side thereof. The entire lift frame 50 is then lifted by the lift truck T and moved to the washing, sorting, or inspecting area whereupon the hydraulic cylinders 86 at either end are activated to extend their respective pistons, while cylinders 88 have the pistons thereof retracted, so that the load engaging frame is caused to rotate to its inverted position shown in FIG. 2. The particulate matter or vegetables or fruit, or other goods within the container C are thus dumped into an appropriate location. The hydraulic cylinders 86,88 are then returned to their normal position, whereupon the load engaging frame is returned to its upright position, and the container may be set down by lowering the lift truck to its lowermost position again raising the tynes 36 and backing the lift truck out from beneath the container.

While the invention is shown with reference to a very detailed description of a preferred embodiment, it is apparent that various changes and modifications might be made to the apparatus actually shown and disclosed without departing from the scope of the invention which is set forth in the claims below.

What is claimed is:

1. A material handling apparatus for use with a lift truck in transporting and dumping containers of the type including front, rear and sidewalls and an open top, said material handling apparatus comprising:

(A) a load engaging frame including:

(1) a rear wall and a plurality of horizontally spaced lower tynes extending forwardly from the lower edge thereof;

(2) a plurality of horizontally spaced upper tynes extending forwardly in vertically spaced, parallel relation to said lower tynes, said upper tynes extending forwardly a distance spanning the open top of the container and including a downwardly depending lip at the free end thereof, said lip over-lying and supporting the front wall of the container;

(B) a lifting frame including:

(1) a rear wall having a forwardly extending side wall depending from the opposite ends thereof, the lateral space between said side walls being greater than the length of said load engaging frame;

(2) pickup means associated with said rear wall whereby said lift truck can engage and lift said load engaging frame;

(C) pivotal connecting means for rotatably connecting said load engaging frame to said lifting frame about an axis of rotation extending between the side walls of said lift frame and transverse to the longitudinal axis of said lift truck;

(D) whereby containers may be engaged across the top and bottom by said upper and lower tynes, lifted and tilted forwardly at least 90° to empty the contents from said containers.

2. The material handling apparatus according to claim 1 wherein said means connecting said upper tynes to said rear wall comprises a bracket means from which at least one of said upper tynes extend forwardly and an elevating means connecting said bracket means to the rear wall of said load engaging means.

3. The material handling apparatus according to claim 2 wherein said elevating means is a hydraulic cylinder.

4. The material handling apparatus according to claim 2 wherein said bracket means comprises a plurality of brackets, each having secured thereto one of said upper tynes, each of said brackets having a separate elevating means associated therewith, and each of said brackets and its upper tyne cooperating with a pair of lower tynes to form a lifting sub-assembly.

5. The material handling apparatus according to claim 1 wherein said load engaging frame includes a pair of end walls extending forwardly from opposite ends of the rear wall thereof, and pivotal connecting means comprises a rotatable member secured to each of the side walls of said load engaging frame, said rotatable member attached for rotation to the side walls of said lift frame, and activating means for rotating said rotatable member through an arc of between 90° and 180°.

6. The material handling apparatus according to claim 5 wherein said activating means includes a chain extending at least partially around said rotatable member and a linear actuator attached to each end of said chain for causing selective reciprocal movement thereof.

* * * * *